United States Patent
Guizilini et al.

(10) Patent No.: US 11,321,859 B2
(45) Date of Patent: May 3, 2022

(54) PIXEL-WISE RESIDUAL POSE ESTIMATION FOR MONOCULAR DEPTH ESTIMATION

(71) Applicant: TOYOTA RESEARCH INSTITUTE, INC., Los Altos, CA (US)

(72) Inventors: Vitor Guizilini, Santa Clara, CA (US); Adrien David Gaidon, Mountain View, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 0 days.

(21) Appl. No.: 16/908,442

(22) Filed: Jun. 22, 2020

(65) Prior Publication Data
US 2021/0398302 A1 Dec. 23, 2021

(51) Int. Cl.
*G06T 7/50* (2017.01)
*G06T 3/00* (2006.01)
*G06T 7/73* (2017.01)

(52) U.S. Cl.
CPC .............. *G06T 7/50* (2017.01); *G06T 3/0093* (2013.01); *G06T 7/74* (2017.01)

(58) Field of Classification Search
CPC ............ G06T 7/50; G06T 7/74; G06T 3/0093
See application file for complete search history.

(56) References Cited

U.S. PATENT DOCUMENTS

| | | | | |
|---|---|---|---|---|
| 9,607,388 B2* | 3/2017 | Lin | ........................ | H04N 13/282 |
| 10,699,472 B2* | 6/2020 | Yeoh | ..................... | H04N 13/344 |
| 2016/0086336 A1* | 3/2016 | Lin | ....................... | H04N 13/282 |
| | | | | 348/50 |
| 2017/0132334 A1* | 5/2017 | Levinson | ................. | G06F 30/20 |
| 2018/0268610 A1* | 9/2018 | Nourai | ................... | G06T 15/205 |
| 2019/0139179 A1* | 5/2019 | Wang | ...................... | G06N 3/088 |
| 2019/0356905 A1* | 11/2019 | Godard | ................... | G06T 7/593 |
| 2021/0073997 A1* | 3/2021 | Vora | ......................... | G06T 7/55 |

FOREIGN PATENT DOCUMENTS

WO 2017154045 A1 9/2017

OTHER PUBLICATIONS

Zhou et al.: "Unsupervised Learning of Depth and Ego-Motion Video", Apr. 2017, IEEE Xplore, pp. 1851-1858 (Year: 2017).*
D. Eigen, et al., "Depth Map Prediction from a Single Image Using a Multi-Scale Deep Network", Advances in Neural Information Processing Systems, pp. 2366-2374, 2014.
B. Li, et al., "Depth and Surface Normal Estimation from Monocular Images Using Regression on Deep Features and Hierarchical CRFs", International Conference on Computer Vision and Pattern Recognition (CVPR), vol. 201, pp. 1119-1127, 2015.

(Continued)

*Primary Examiner* — John B Strege
(74) *Attorney, Agent, or Firm* — Seyfarth Shaw LLP (57) ABSTRACT

A method for scene reconstruction includes generating a depth estimate and a first pose estimate from a current image. The method also includes generating a second pose estimate based on the current image and one or more previous images in a sequence of images. The method further includes generating a warped image by warping each pixel in the current image based on the depth estimate, the first pose estimate, and the second pose estimate. The method still further includes controlling an action of an agent based on the second warped image.

18 Claims, 7 Drawing Sheets

(56) References Cited

OTHER PUBLICATIONS

I. Laina, et al., "Deeper Depth Prediction with Fully Convolutional Residual Networks", International Conference on 3D Vision (3DV), pp. 239-248, 2016.
X. Wang, et al., "Designing Deep Networks for Surface Normal Estimation", International Conference on Computer Vision and Pattern Recognition (CVPR), pp. 539-547, 2015.
X. Qi, et al., "Geonet: Geometric Neural Network for Joint Depth and Surface Normal Estimation", International Conference on Computer Vision and Pattern Recognition (CVPR), pp. 283-291, 2018.
J.-H. Lee, et al., "Single-image Depth Estimation Based on Fourier Domain Analysis", International Conference on Computer Vision and Pattern Recognition (CVPR), pp. 330-339, 2018.
H. Fu, et al., "Deep Ordinal Regression Network for Monocular Depth Estimation", International Conference on Computer Vision and Pattern Recognition (CVPR), pp. 2002-2011, 2018.
R. Garg, et al., "Unsupervised CNN for Single View Depth Estimation: Geometry to the Rescue", European Conference on Computer Vision, pp. 740-756. Springer, 2016.
C. Godard, et al., "Unsupervised Monocular Depth Estimation with Left-Right Consistency", IEEE Computer Vision and Pattern Recognition (CVPR), vol. 2, p. 7, 2017.
M. Jaderberg, et al., "Spatial Transformer Networks", Advances in Neural Information Processing Systems, pp. 2017-2025, 2015.
Z. Wang, et al., "Image Quality Assessment: From Error Visibility to Structural Similarity", IEEE Transactions on Image Processing, 13(4):600-612, 2004.
B. Ummenhofer, et al., "DeMoN: Depth and Motion Network for Learning Monocular Stereo"., IEEE Conference on Computer Vision and Pattern Recognition (CVPR), vol. 5, p. 6, 2017.
T. Zhou, et al., "Unsupervised Learning of Depth and Ego-motion from Video", IEEE Conference on Computer Vision and Pattern Recognition (CVPR), vol. 2, p. 7, 2017.
Z. Yin, et al., "Geonet: Unsupervised Learning of Dense Depth, Optical Flow and Camera Pose", Proceedings of the IEEE Conference on Computer Vision and Pattern Recognition (CVPR), vol. 2, 2018.
R. Mahjourian, et al., "Unsupervised Learning of Depth and Ego-motion from Monocular Video Using 3D Geometric Constraints", Proceedings of the IEEE Conference on Computer Vision and Pattern Recognition (CVPR), pp. 5667-5675, 2018.
V. Casser, et al., "Depth Prediction without the Sensors: Leveraging Structure for Unsupervised Learning from Monocular Videos", Thirty-Third AAAI Conference on Artificial Intelligence (AAAI), 2019.
Y. Zou, et al., "DF-Net: Unsupervised Joint Learning of Depth and Flow using Cross-Task Consistency", European Conference on Computer Vision (ECCV), 2018.
L. Zhou, et al., "Unsupervised Learning of Monocular Depth Estimation with Bundle Adjustment, Super-Resolution and Clip Loss". arXiv preprint arXiv:1812.03368, 2018.
M. Klodt, et al., "Supervising the New with the Old: Learning SFM from SFM", European Conference on Computer Vision (ECCV), pp. 713-728. Springer, 2018.
C. Wang, et al., "Learning Depth from Monocular Videos Using Direct Methods", Proceedings of the IEEE Conference an Computer Vision and Pattern Recognition (CVPR), pp. 2022-2030, 2018.
N. Yang, et al., "Deep Virtual Stereo Odometry: Leveraging Deep Depth Prediction for Monocular Direct Sparse Odometry", European Conference on Computer Vision (ECCV), arXiv preprint arXiv:1807.02570, 2018.
V. Guizilini, et al., "Packnet-SFM: 3D Packing for Self-Supervised Monocular Depth Estimation". arXiv preprint arXiv:1905.02693, 2019.
C. Godard, et al., "Digging Into Self-Supervised Monocular Depth Estimation", arXiv preprint arXiv:1806.01260v3, 2018.
Ochs, et al., "SDNet: Semantically Guided Depth Estimation Network", arXiv:1907.10659, German Conference on Pattern Recognition (GCPR), Dortmund, Germany, Sep. 2019.
Schneider, et al., "Semantically Guided Depth Upsampling", German Conference on Pattern Recognition (GCPR), 2016.
Chen, et al., "Towards Scene Understanding: Unsupervised Monocular Depth Estimation with Semantic-aware Representation", The IEEE Conference on Computer Vision and Pattern Recognition (CVPR), Jun. 2019.
Su, et al., "Pixel-Adaptive Convolutional Neural Networks", submitted Conference on Computer Vision and Pattern Recognition (CVPR), 2019.
Ambrus, et al., "Two-Stream Networks for Self-Supervised Ego-Motion Estimation", Conference on Robot Learning (CoRL), arXiv:1910.01764, 2019.
Tang, et al., "Self-Supervised 3D Keypoint Learning for Ego-Motion Estimation", arXiv:1912.03426, 2019.
Tang, et al., "Neural Outlier Rejection for Self-Supervised Keypoint Learning", https://openreview.net/forum?id=Skx82ySYPH, 2019.
Wang, et al., "Joint Unsupervised Learning of Optical Flow and Depth by Watching Stereo Videos", arXiv:1810.03654, 2018.
Wang, et al., "Flow-Motion and Depth Network for Monocular Stereo and Beyond", arXiv:1909.05452, 2019.
Casser, et al., "Unsupervisd Monocular Depth and Ego-Motion Learning with Structure and Semantics", CVPR workshop on Visual Odometry and Computer Vision Application based on Local Cues (VOCVALC), 2019.
Yu, et al., "Back to Basics: Unsupervised Learning of Optical Flow via Brightness Constancy and Motion Smoothness", Proceedings of the 14th European Conference on Computer Vision (ECCV 2016), Amsterdam, The Netherlands, Oct. 8-16, 2016, pp. 3-10.
Wang, et al., "Learning Depth from Monocular Videos using Direct Methods", 2018 IEEE/CVF Conference on Computer Vision and Pattern Recognition, Jun. 18-23, 2018.
Xu, et al., Region Deformer Networks for Unsupervised Depth Estimation from Unconstrained Monocular Videos:, arXiv:1902.09907, May 23, 2019.
Luo, et al., "Every Pixel Counts ++: Joint Learning of Geometry and Motion with 3D Holistic Understanding", arXiv:1810.06125, Jul. 11, 2019.

* cited by examiner

PIXEL-WISE RESIDUAL POSE ESTIMATION FOR MONOCULAR DEPTH ESTIMATION

BACKGROUND

Field

Certain aspects of the present disclosure generally relate to scene reconstruction systems.

Background

Autonomous agents (e.g., vehicles, robots, etc.) rely on machine vision for constructing a three-dimensional (3D) representation of a surrounding environment. The 3D representation may be used for various tasks, such as localization and/or autonomous navigation. The 3D representation accuracy improves the autonomous agent's ability to perform various tasks. It is desirable to improve the accuracy of a 3D representation constructed from images captured by the autonomous agent.

SUMMARY

In one aspect of the present disclosure, a method for scene reconstruction is disclosed. The method includes generating a depth estimate and a first pose estimate from a current image. The method also includes generating a second pose estimate based on the current image and at least one previous image in a sequence of images. The method further includes generating a warped image by warping each pixel in the current image based on the depth estimate, the first pose estimate, and the second pose estimate. The method still further includes controlling an action of an agent based on the second warped image.

In another aspect of the present disclosure, a non-transitory computer-readable medium with non-transitory program code recorded thereon is disclosed. The program code is for scene reconstruction. The program code is executed by a processor and includes program code to generate a depth estimate and a first pose estimate from a current image. The program code also includes program code to generate a second pose estimate based on the current image and at least one previous image in a sequence of images. The program code further includes program code to generate a warped image by warping each pixel in the current image based on the depth estimate, the first pose estimate, and the second pose estimate. The program code still further includes program code to control an action of an agent based on the second warped image.

Another aspect of the present disclosure is directed to an apparatus. The apparatus having a memory, one or more processors coupled to the memory, and instructions stored in the memory. The instructions being operable, when executed by the processor, to cause the apparatus to generate a depth estimate and a first pose estimate from a current image. The instructions also cause the apparatus to generate a second pose estimate based on the current image and at least one previous image in a sequence of images. The instructions additionally cause the apparatus to generate a warped image by warping each pixel in the current image based on the depth estimate, the first pose estimate, and the second pose estimate. The instructions further cause the apparatus to control an action of an agent based on the second warped image.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

An agent, such as an autonomous agent, may generate a 3D representation of an environment based on one or more images obtained from a sensor. The 3D representation may also be referred to as a 3D model, a 3D scene, or a 3D map. 3D representations may facilitate various tasks, such as scene understanding, motion planning, and/or obstacle avoidance. For example, the agent may autonomously navigate through an environment based on the 3D representation.

The ability to perceive distances through depth estimation based on sensor data provides an ability to plan/estimate ego-motion through the environment. However, depending on the available onboard sensors, the agent may acquire a limited perspective of the environment. As a result, the agent may encounter difficulties in distinguishing aspects of the environment.

That is, various sensors perceive aspects of the environment differently and have different implementation characteristics. For example, LiDAR (light detection and ranging) provides improved depth perception but may encounter errors in certain weather conditions. Other sensors, such as stereo cameras, may capture depth information but may have a limited field-of-view. Monocular cameras may be cost-effective, however, the sensor data does not explicitly include depth information.

In some cases, an agent implements processing routines for deriving depth information from the monocular images. For example, conventional depth networks generate 3D representations based on hand-engineered features. That is, the depth network may be trained to estimate depth via labeled data (e.g., supervised training).

Deep learning approaches, such as self-supervised learning, may eliminate hand-engineered features (e.g., labeled data) and improve depth estimates as well as 3D model reconstruction. For example, deep learning approaches improve the reconstruction of textureless regions and/or geometrically under-determined regions. Aspects of the present disclosure are directed to improving depth estimates and single-image scene reconstruction via self-supervised learning. Aspects of the present disclosure are directed to improving single-image scene reconstruction via self-supervised learning. The single-image scene reconstruction may account for residual flow based on pixel-wise residual flow estimates.

Aspects of the present disclosure are not limited to an autonomous agent. Aspects of the present disclosure also contemplate an agent operating in a manual mode or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

Figure 1:
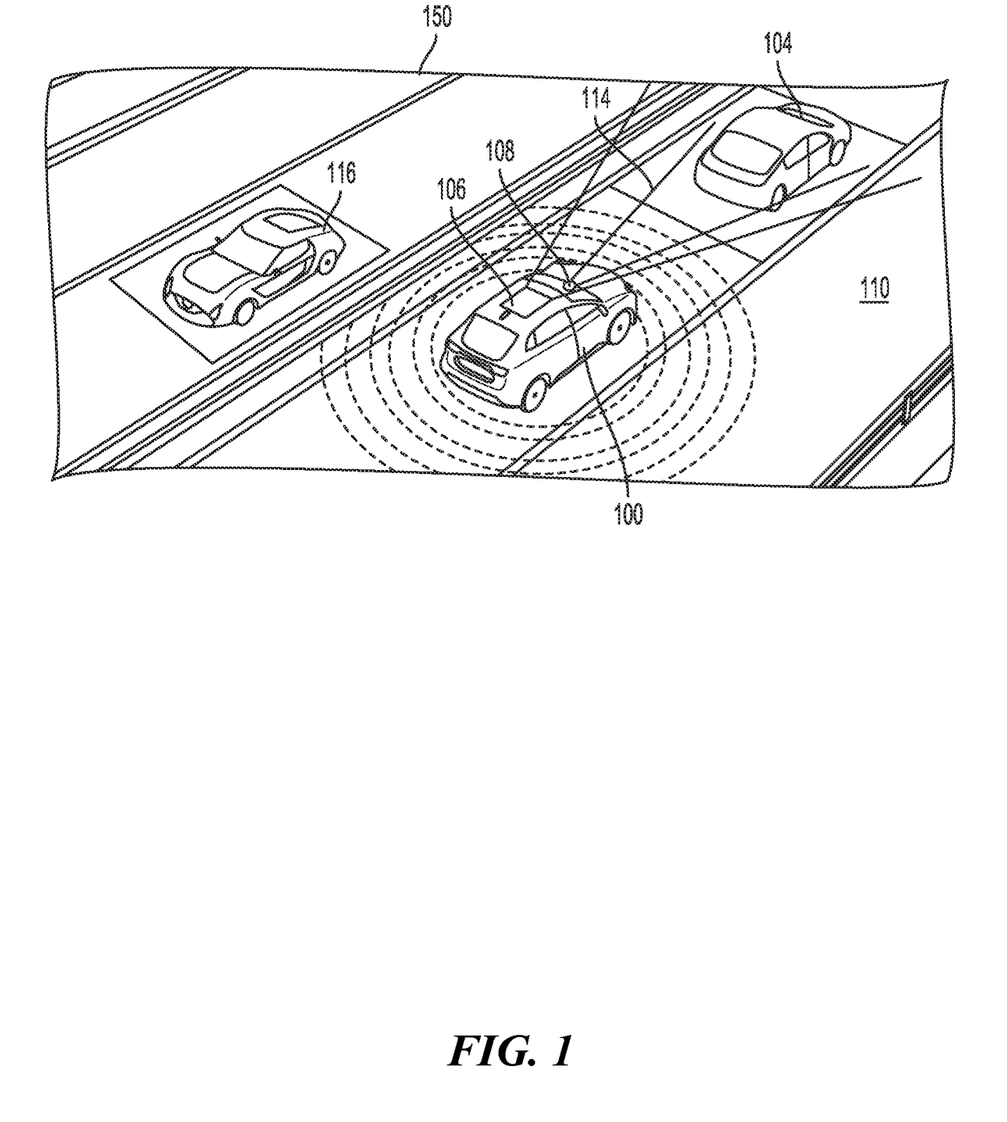
FIG. 1 illustrates an example of a vehicle in an environment according to aspects of the present disclosure.

FIG. 1 illustrates an example of an ego vehicle 100 (e.g., ego agent) in an environment 150 according to aspects of the present disclosure. As shown in FIG. 1, the ego vehicle 100 is traveling on a road 110. A first vehicle 104 (e.g., other agent) may be ahead of the ego vehicle 100, and a second vehicle 116 may be adjacent to the ego vehicle 100. In this example, the ego vehicle 100 may include a 2D camera 108, such as a 2D RGB camera, and a second sensor 106. The second sensor 106 may be another RGB camera or another type of sensor, such as RADAR and/or ultrasound. Additionally, or alternatively, the ego vehicle 100 may include one or more additional sensors. For example, the additional sensors may be side facing and/or rear facing sensors.

In one configuration, the 2D camera 108 captures a 2D image that includes objects in the 2D camera's 108 field of view 114. The second sensor 106 may generate one or more output streams. The 2D image captured by the 2D camera includes a 2D image of the first vehicle 104, as the first vehicle 104 is in the 2D camera's 108 field of view 114.

The information obtained from the sensors 106, 108 may be used to navigate the ego vehicle 100 along a route when the ego vehicle 100 is in an autonomous mode. The sensors 106, 108 may be powered from electricity provided from the vehicle's 100 battery (not shown). The battery may also power the vehicle's motor. The information obtained from the sensors 106, 108 may be used to generate a 3D representation of an environment.

As discussed, conventional systems use one or more sensors, such as LIDAR, to build 3D representations of a local environment. LIDAR sensors may provide reliable and accurate range data at large distances. A LIDAR sensor may be used for a variety of applications, such as mapping, localization, object detection, and collision avoidance.

Still, due to their cost, LIDAR sensors may not be economically viable. Additionally, a LIDAR sensor's 3D reconstruction may be sparse. Cameras, such as a red-green-blue (RGB) camera, may provide dense scene information and a spatial understanding of the scene by reasoning across space and time. Additionally, cameras may be more economically viable in comparison to LIDAR sensors.

Aspects of the present disclosure are directed to a system for training and using a depth network to build 3D representation from one or more images captured by a single camera. In one configuration, the self-supervised training for image-based depth estimation leverages geometric constraints inherent in robots.

In one configuration, depth and ego-motion are estimated from monocular camera imagery. Aspects of the present disclosure improve monocular depth estimates generated from a depth network trained in a self-supervised manner. Improved monocular depth estimates bridge a gap between LIDAR and vision solutions, such that cameras may augment, complement, or substitute range sensors (e.g., LIDAR sensors).

The bridged gap may reduce costs and provide an increased number of robust solutions because cameras compliment range sensor functionality. For example, in comparison to a LIDAR sensor, a camera may function better in some environments, such as a rainy environment. In contrast, in comparison to the camera, the LIDAR sensor may function better in other environments, such as low-light conditions. Therefore, monocular depth estimates may improve an agent's ability to perform various tasks.

Furthermore, cameras may produce a greater amount of image data in comparison to LIDAR data. The image data may be used as training data for a depth network. As such, the use of a monocular sensor may increase the amount of training data, thereby improving self-supervised monocular depth estimates.

In the current disclosure, unless otherwise noted, a self-supervised monocular depth network refers to a depth network trained in a self-supervised manner to generate a 3D representation from a single-camera. Self-supervised training refers to learning from raw input data without any ground-truth information. The self-supervised monocular depth network may also be referred to as a self-supervised single-camera depth network. The self-supervised monocular depth network may recover depth if a camera's motion is estimated between timesteps (e.g., frames).

A supervised monocular depth network refers to a depth network trained in a supervised manner. The supervised monocular depth network learns an estimation function by regressing input images to estimated depth outputs. In supervised training, the network learns from labeled ground-truth information. For example, supervised monocular depth networks may use ground truth depth (e.g., LIDAR data) to train a neural network as a regression model. As such, the monocular depth network does not estimate the camera's motion during supervised training.

In a supervised depth network, a convolutional neural network generates an initial coarse prediction and refines the prediction using another neural network to produce more accurate results. As supervised techniques for depth estimation advance, the availability of target depth labels is reduced due to the costs of generating labeled data. For example, a task of manually labeling outdoor scenes is time consuming.

Thus, some conventional depth networks are trained with stereo cameras to mitigate the need for ground-truth depth labels. In a stereo-camera setting, a baseline distance between two cameras is known and fixed. Therefore, a stereo-camera depth network may estimate depth without estimating the camera's motion between timesteps.

Conventional pose estimation systems implement different models and processes for monocular pose estimation. Some conventional pose estimation systems use dense networks that receive two input images and output the transformation between them. Other conventional systems generate sparse keypoint networks that extract keypoints from input images and match them to images in a database of images.

Conventional pose estimation systems assumes a static world. Some conventional pose estimation systems learn a single transformation between images, this transformation is assumed to be the camera's own motion (ego-motion). This transformation may be reflected in all observed pixels. In some cases, a pose network learns the ego-motion. Dynamic objects present a challenge for self-supervised monocular depth networks. In some cases, depth networks may fail to generate a scene when one or more dynamic objects are detected.

Convention pose estimation systems use various methods to alleviate errors caused by dynamic objects. These methods may include the use of masks, motion models for objects, and the joint estimation of optical flow. Still, these methods specify additional information at training time or the use of extra networks for training.

As described, some conventional pose estimation systems address dynamic objects by masking out the dynamic objects or learning motion models for the dynamic objects. For example, a conventional depth network may obtain semantic or instance segmentation from another pre-trained network to generate a mask. The depth and pose networks cannot learn from masked out objects, thereby reducing model accuracy. Additionally, the masks may mask static objects used for ego-motion estimation. Additionally, semantic or instance masks are learned via supervised training, which is in contrast to the self-supervised learning of the current disclosure.

Some conventional pose estimation systems do not assume a static world and learn a motion of each pixel in an image. The motion of each pixel may be referred to as optical flow. Optical flow estimation may be challenging due to its ambiguity and lack of training data. For example, training data may be limited due to the difficulty in annotating (e.g., labeling) real images. Additionally, synthetic datasets are limited due to domain adaptation problems.

As described above, some conventional pose estimation systems use motion models. Motion models use semantic and/or instance information to segment objects in the scene. The segmented objects are assigned to a particular motion model for tracking to compensate for external motion. Motion models may use additional system resources, such as power and memory.

Aspects of the present disclosure improve an accuracy of depth and pose networks by learning a residual pixel-wise motion component. In such aspects, each pixel may be independently warped, rather than based on a single ego-motion estimate. Aspects of the present disclosure may improve scene reconstruction in view of external motion.

In some examples, a per-pixel residual pose is learned to account for external motion, such as an object moving in a scene. The per-pixel residual pose may be referred to as per-pixel residual motion. In one configuration, each pixel in the image expresses different ego-motion estimates, in addition to a global ego-motion estimate generated by a pose network.

Aspects of the present disclosure are not limited to residual per-pixel residual motion. A pixel-wise pose network may be trained to account for all motion, not only a residual. In most cases, it is assumed that a majority of the motion in a scene may be correspond to the camera's own motion (e.g., ego-motion). Still, some motion may be attributed to dynamic objects.

As described, in some examples, each individual pixel for the target image is warped according to its own depth and pose estimates to generate a reconstructed image (e.g., warped source image). A scene reconstruction network may be trained on the difference between the target image and the reconstructed image. The network may be trained to minimize the loss, such as a photometric loss. In some implementation, depth networks and pose networks may be simultaneously trained to learn depth, camera motion, and external pixel-wise motion. The network may be trained to account for external pixel-wise motion, such that the network correctly warp pixels with external motion. In such implementations, correctly warped pixels are aligned between frames even considering the presence of dynamic objects.

Conventional convolutional architectures use striding and pooling to increase field sizes. The striding and pooling may decrease model performance for tasks requiring fine-grained representations. Additionally, conventional upsampling processes fail to propagate and preserve sufficient details at the decoder layers, thereby reducing the accuracy of depth predictions.

In contrast to conventional convolutional architectures, aspects of the present disclosure implement an encoder-decoder architecture with 3D packing and unpacking blocks. In one configuration, the packing and unpacking blocks downsample and upsample feature maps during the encoding and decoding stages. Additionally, the packing and unpacking blocks learn to jointly preserve and recover spatial information for depth estimation.

In one configuration, a packing block folds the spatial dimensions of convolutional feature maps into additional feature channels. That is, the feature space is concatenated. The resulting tensor is at a reduced resolution. In contrast to striding or pooling, the spatial dimension transformation is invertible and comes at no loss. Next, the concatenated feature space is compressed to reduce its dimensionality to a desired number of output channels. Specifically, the concatenated feature space is expanded via a 3D convolutional layer. The resulting higher dimensional feature space is then flattened via reshaping before applying the final 2D convolutional contraction.

The unpacking block may decompress and unfold packed convolutional feature channels back to higher resolution spatial dimensions during the decoding process. The unpacking block replaces convolutional feature upsampling, typically performed via nearest-neighbor or with learnable transposed convolutional weights. The unpacking process reverses the 3D packing process performed by the encoder.

During the unpacking process, a 2D convolutional layer produces the required number of feature channels for a subsequent 3D convolutional layer. The 3D convolution expands the compressed spatial features. The unpacked features are then converted back to spatial details via a reshape operation to obtain a tensor with the desired number of output channels and target higher resolution.

Figure 2A:
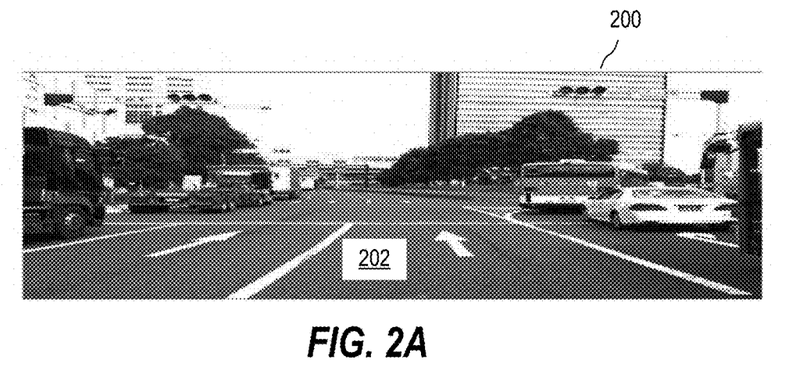
FIG. 2A is an example of a single image according to aspects of the present disclosure.

FIG. 2A illustrates an example of a target image 200 of a scene 202 according to aspects of the present disclosure. The target image 200 may be captured by a monocular camera. The monocular camera may capture a forward-facing view of an agent (e.g., a vehicle). In one configuration, the monocular camera is integrated with the vehicle. For example, the monocular camera may be defined in a roof structure, windshield, grill, or other portion of the vehicle. The vehicle may have one or more cameras and/or other types of sensors. The target image 200 may also be referred to as a current image. The target image 200 captures a 2D representation of a scene.

Figure 2B:
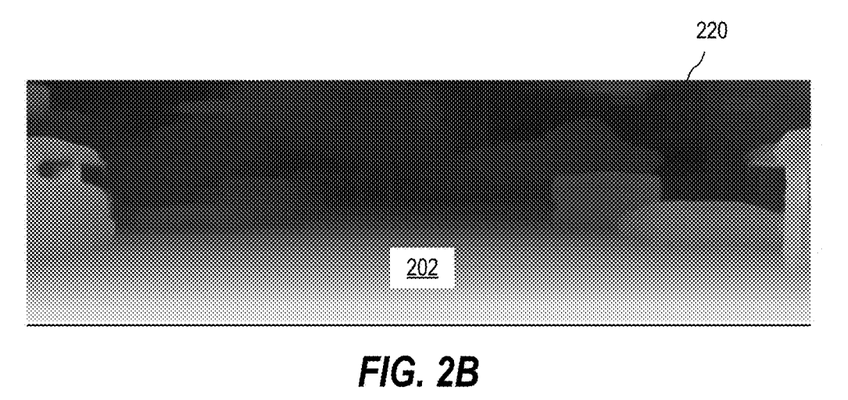
FIG. 2B is an example of a depth map according to aspects of the present disclosure.

FIG. 2B illustrates an example of a depth map 220 of the scene 202 according to aspects of the present disclosure. The depth map 220 may be estimated from the target image 200 and one or more source images. The source images may be images captured at a previous time step in relation to the target image 200. The depth map 220 provides a depth of a scene. The depth may be represented as a color or other feature.

Figure 2C:
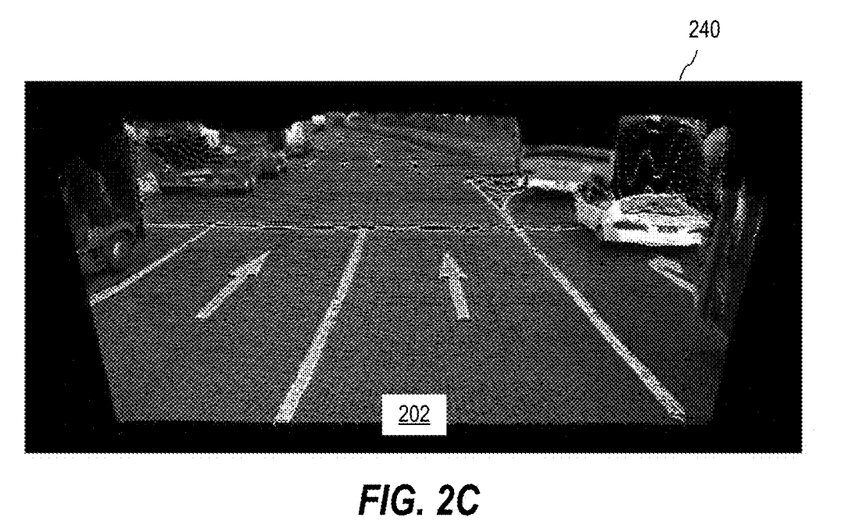
FIG. 2C is an example of a reconstructed target image according to aspects of the present disclosure.

FIG. 2C illustrates an example of a 3D reconstruction 240 of the scene 202 according to aspects of the present disclosure. The 3D reconstruction may be generated from the depth map 220 as well as a pose of the target image 200 and a source image. As shown in FIGS. 2A and 2C, the viewing angle of the scene 202 in the 3D reconstruction 240, is different from the viewing angle of the scene 202 in the target image 200. Because the 3D reconstruction 240 is a 3D view of the scene 202, the viewing angle may be changed as desired. The 3D reconstruction 240 may be used to control one or more actions of the agent.

Figure 3:
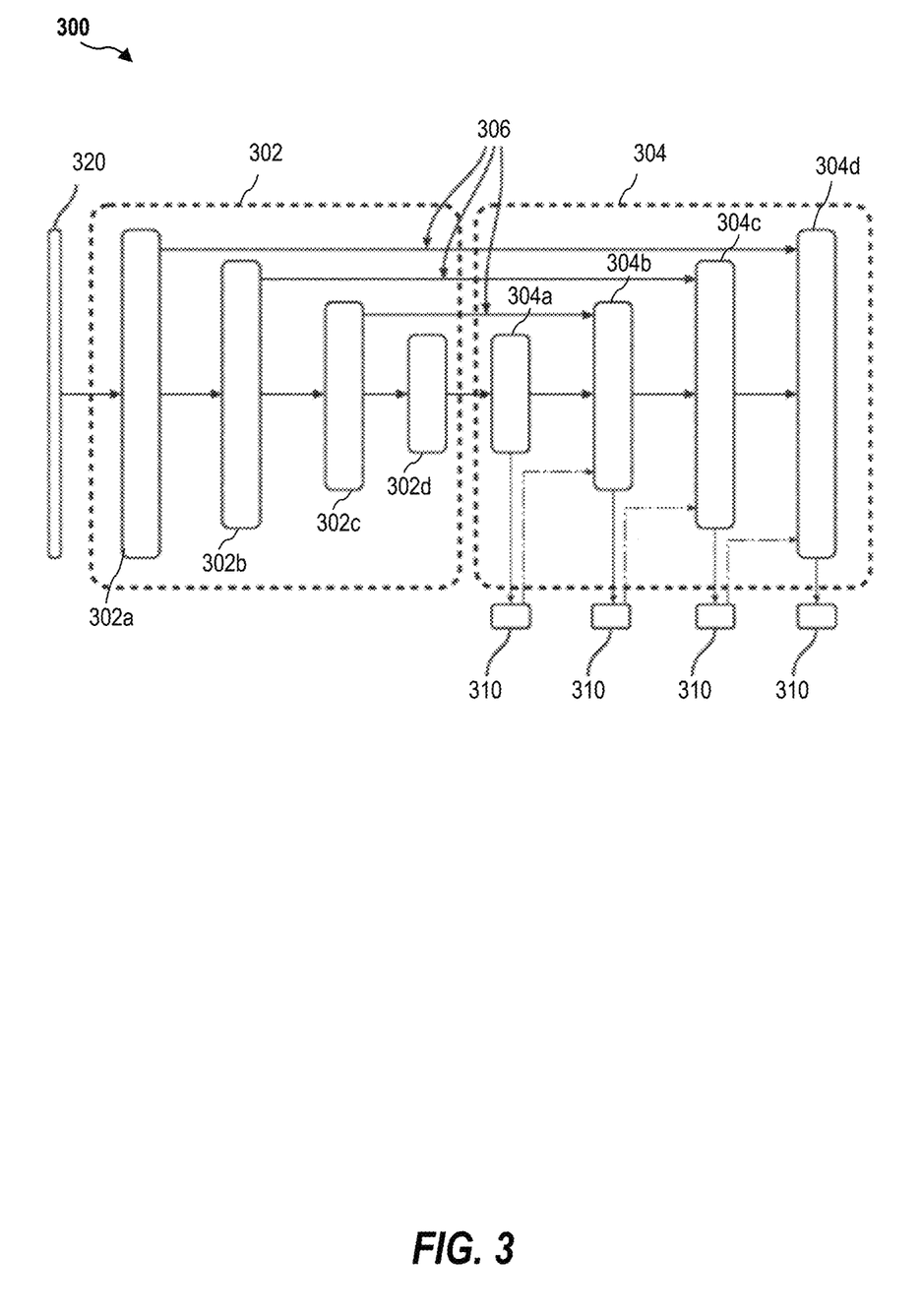
FIG. 3 illustrates an example of a depth network according to aspects of the present disclosure.

FIG. 3 illustrates an example of a depth network 300 according to aspects of the present disclosure. As shown in FIG. 3, the depth network 300 includes an encoder 302 and a decoder 304. The depth network 300 generates a per-pixel depth map, such as the depth map 220 of FIG. 2B, of an input image 320.

The encoder 302 includes multiple encoder layers 302a-d. Each encoder layer 302a-d may be a packing layer for downsampling features during the encoding process. The decoder 304 includes multiple decoder layers 304a-d. In FIG. 3, each decoder layer 304a-d may be an unpacking layer for upsampling features during the decoding process. That is, each decoder layer 304a-d may unpack a received feature map.

Skip connections 306 transmit activations and gradients between encoder layers 302a-d and decoder layers 304a-d. The skip connections 306 facilitate resolving higher resolution details. For example, a gradient may be directly back-propagated to layers via the skip connections 306, thereby improving training. Additionally, the skip connections 306 directly transmit image details (e.g., features) from convolutional layers to deconvolutional layers, thereby improving image recovery at higher resolutions.

The decoder layers 304a-d may generate intermediate inverse depth maps 310. Each intermediate inverse depth map 310 may be upsampled before being concatenated with a corresponding skip connection 306 and feature maps unpacked by a corresponding decoder layer 304a-d. The inverse depth maps 310 also serve as the output of the depth network from which the loss is calculated. In contrast to conventional systems that incrementally super-resolve each inverse depth map 310. Aspects of the present disclosure upsample each inverse depth map 310 to a highest resolution using bilinear interpolation. Upsampling to the highest resolution reduces copy-based artifacts and photometric ambiguity, thus improving depth estimates.

In one configuration, the depth network 300 is augmented to estimate a seven-dimensional channel output instead of estimating a one-channel output of inverse depth estimates. The seven-dimensional channel output includes an inverse depth estimate, obtained by applying a sigmoid nonlinearity that constrains the output between zero and 1/min_depth, where min_depth is a minimal distance the network may estimate. For example, the minimal distance may be 0.5 m. The seven-dimensional channel output also includes six degrees of freedom (DoF) for pose estimation. The six DoF include x, y, z coordinates as well as a roll, pitch, and yaw. Non-linearity is not specified for the six DoF. The six DoF pose estimation generated by the depth network 300 is generated per pixel. In contrast, a six DoF pose estimation generated by a pose network, such as the pose network 400 discussed in FIG. 4, is generated for an entire Image.

Figure 4:
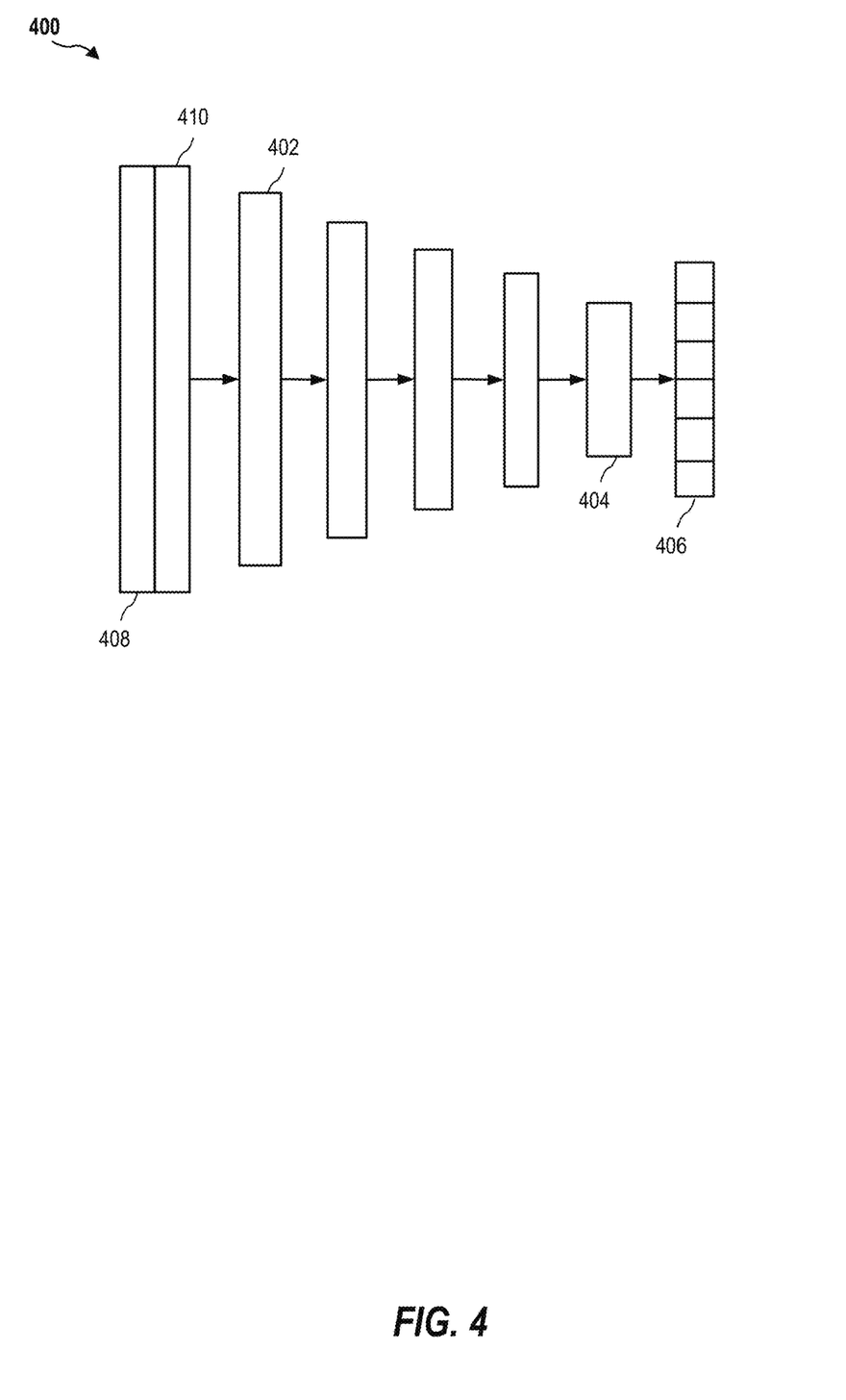
FIG. 4 illustrates an example of a pose network according to aspects of the present disclosure.

FIG. 4 illustrates an example of a pose network 400 for ego-motion estimation according to aspects of the present disclosure. In contrast to conventional pose networks, the pose network 400 of FIG. 4 does not use explainability masks.

As shown in FIG. 4, the pose network 400 includes multiple convolutional layers 402, a final convolutional layer 404, and a multi-channel (e.g., six-channel) average pooling layer 406. The final convolutional layer 404 may be a 1×1 layer. The multi-channel layer 406 may be a six-channel layer.

In one configuration, a target image ($I_t$) 408 and a source image ($I_s$) 410 are input to the pose network 400. The target image 408 and source image 410 may be concatenated when input to the pose network 400. During training, one or more source images 410 may be used during different training epochs. The source images 410 may include an image at a previous time step (t−1) and an image at a subsequent time step (t+1). The output is a set of six DoF transformations between the target image 408 and the source image 410. The process may be repeated for each source image 410 if more than one source image 410 is considered.

Figure 5:
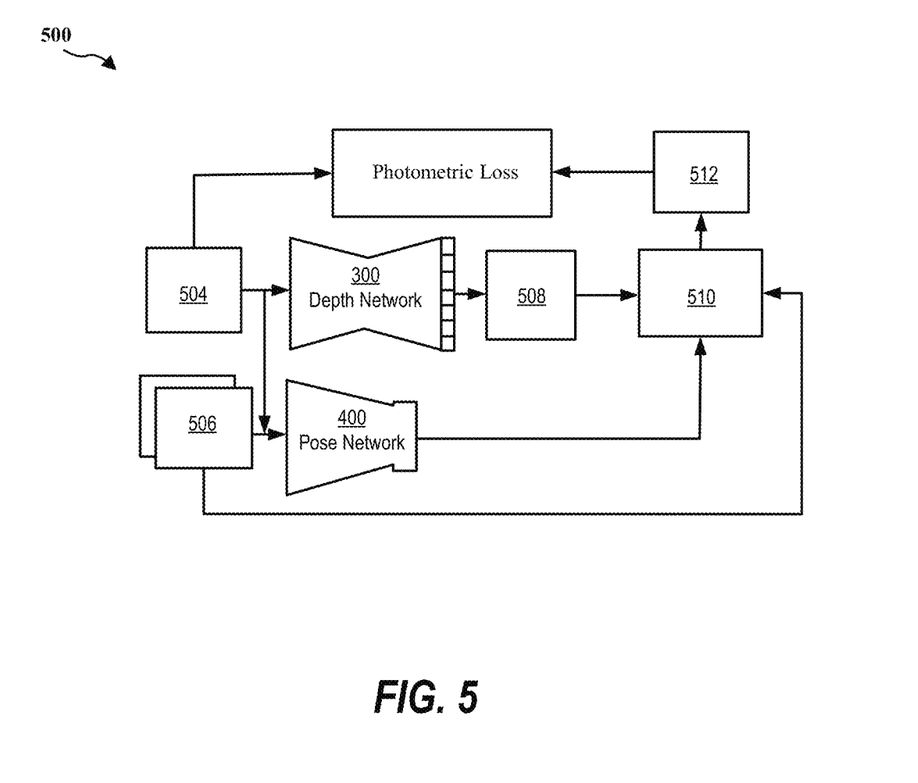
FIG. 5 illustrates an example of a training pipeline according to aspects of the present disclosure.

FIG. 5 illustrates an example of a training pipeline 500 according to aspects of the present disclosure. As shown in FIG. 5, the training pipeline 500 trains the depth network 300 from FIG. 3 and the pose network 400 from FIG. 4. The depth network 300 receives a target image ($I_t$) 504. The pose network 400 receives the target image 504 and source images ($I_s$) 506. The source images 506 are also referred to as context images.

As shown in FIG. 5, the depth network 300 generates a depth map ($\hat{D}_T$) 508 of the target image 504. As discussed, the depth map 508 may be a per-pixel depth map. As discussed, the depth network 300 is augmented to estimate a seven-dimensional channel output. The seven-dimensional channel output includes an inverse depth estimate, obtained by applying a sigmoid nonlinearity that constrains the output between zero and 1/min_depth, where min_depth is a minimal distance the network may estimate. For example, the minimal distance may be 0.5 m. The seven-dimensional channel output also includes six DoF for pose estimation. The six DoF include x, y, z coordinates, as well as a roll, pitch, and yaw. The six DoF in the seven-dimensional channel output of the depth network 300 may be similar to the six DoF output of the pose network 400.

A view estimation module 510 receives the seven-dimensional channel output of the depth network 300 and the six DoF transformation (e.g., relative pose) output of the pose network 400. As discussed, six DoF transformation determined by the pose network 400 is a transformation between the target image 504 and the source image 506. The view estimation module 510 warps the source image 506 to reconstruct the target image 504. The reconstructed target image may be referred to as the warped image 512 ($\hat{I}_t$).

Specifically, the view estimation module 510 generates a transformation matrix between frames. In one configuration, one global transformation matrix and one local transformation matrix is specified for each pixel. The global transformation matrix is for all pixels. The local transformation matrix may be per-pixel. A full transformation matrix for a pixel is a product of the global transformation and the local transformation. That is, the full transformation matrix may be generated based on a product of a matrix multiplication of the seven-dimensional channel output of the depth network 300 and the seven-dimensional output of the pose network 400. The view estimation module 510 warps the pixels based on the per pixel transformations to generate an image reconstruction. The reconstruction may be considered a reconstruction of a source image 506 as viewed by the target image 504. In some aspects, the global and local transformations individually warp each pixel from the target image. Each pixel may be warped with a corresponding depth estimate to reconstruct the source image.

That is, the warped image 512 is generate by sampling pixels from the target image 504 based on the predicted depth map 508 and the transformations (e.g., global transformation and local transformation). For example, each point (e.g., pixel) in the target image 504 is projected onto the source image 506 based on the predicted depth map 508 and the transformation matrix. Bilinear interpolation of pixels neighboring the target image pixel projected onto the source image 506 may approximate a value of the target pixel. The approximated value may be used as the value of the pixel in the warped image 512. In some examples, the bilinear sampling mechanism linearly interpolates values of multiple pixel neighbors (such as, top-left, top-right, bottom-left, and bottom-right) of the target pixel projected onto the source the source image 506. That is, the color of the pixel in the warped image 512 may be based on neighboring pixels in the source image 506. The warped image 512 may be a 3D reconstruction of a 2D target image.

A photometric loss is calculated based on the difference between the target image 504 and the warped image 512 (e.g., the warped source image that approximates the target image). As shown in FIG. 5, the training pipeline 500 determines a photometric loss 516 based on a comparison of the warped image 512 and the target image 504. The photometric loss 516 may be used to update the depth network 300, the view estimation module 510, and/or the pose network 400.

The photometric loss 516 ($L_p$) may be determined as follows:

$$L_p(I_t, \hat{I}_t) = \alpha \frac{1 - SSIM(I_t, \hat{I}_t)}{2} + (1 - \alpha)\|I_t - \hat{I}_t\|, \quad (1)$$

where SSIMO is a function for estimating a structural similarity (SSIM) between the target image 504 and the warped image 512. SSIM may be determined as follows:

$$SSIM(x,y) = [L(x,y)]^\alpha \cdot [c(x,y)]^\beta \cdot [s(x,y)]^\gamma, \quad (2)$$

where s( ) determines a structure similarity, c( ) determines a contrast similarity, and l( ) determines a luminance similarity. $\alpha$, $\beta$, and $\gamma$ are parameters for adjusting a relative importance of each component, and each parameter is greater than zero.

During a testing stage, the training pipeline 500 may generate the warped image 512 as described above. The photometric loss 516 may not be calculated during a testing stage. The warped image 512 may be used for localization and/or other vehicle navigation tasks.

The warped target image may model external motion because each pixel may have its own transformation to model motion independently from other pixels. Still, each pixel maintains the global transformation that represents the camera's ego-motion (e.g., the camera's own motion). The camera's ego-motion may have a same effect for all pixels, as if they were all moving relative to the camera.

By modeling both external motion and ego-motion, the photometric loss may also estimate a loss in dynamic scenes because a static world assumption is no longer valid. Accounting for a loss in dynamic scenes improves training conditions which result in more accurate models for monocular depth estimation. That is, the self-supervised training process may leverage dynamic object information and also learn from the dynamic object information.

In one configuration, a new warping function, such as a residual flow warping function, is not specified. As such, constraints produced by the depth and pose networks are maintained. That is, the output learned by the depth network is still depth, and the output learned by the pose network is still be pose.

Figure 6:
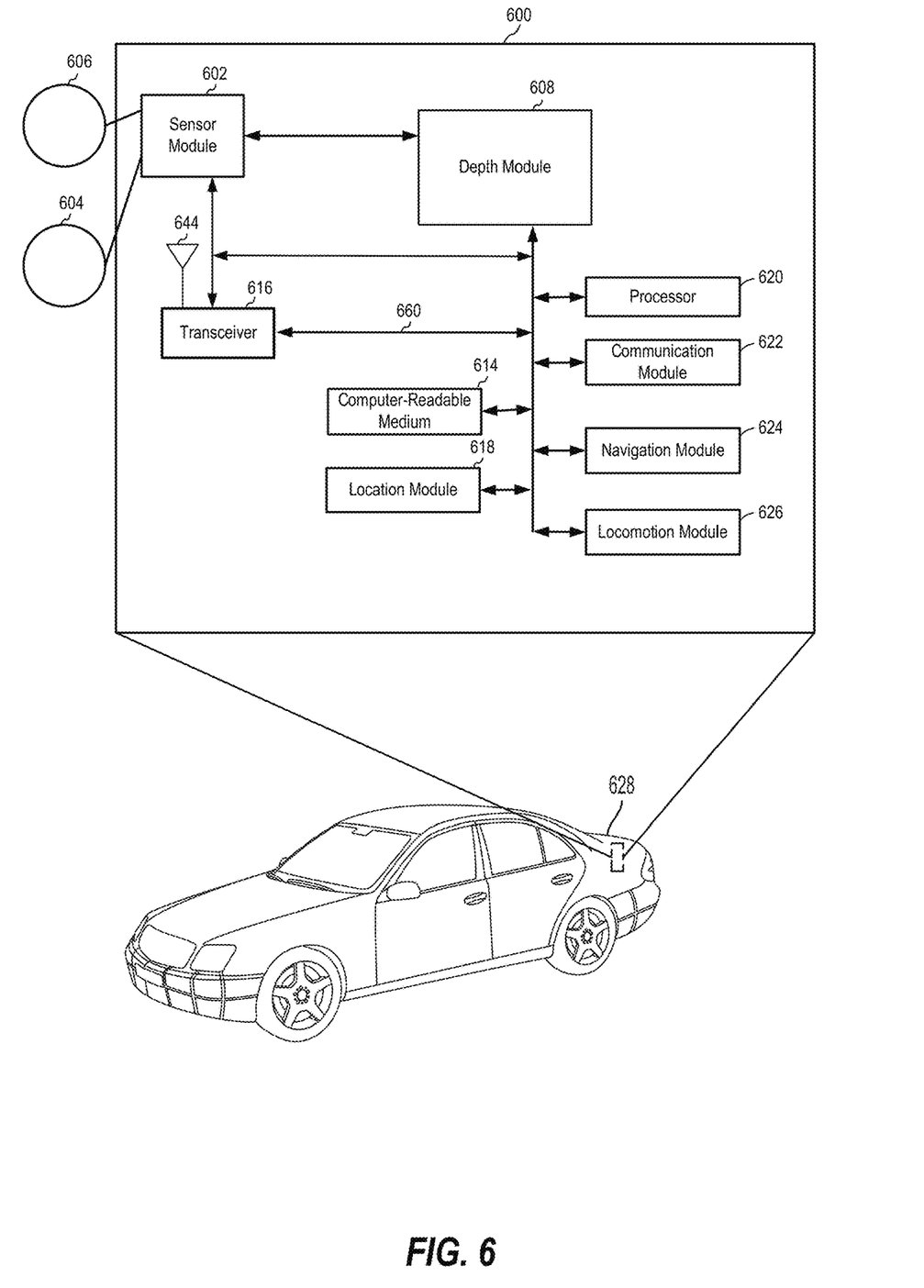
FIG. 6 is a diagram illustrating an example of a hardware implementation for a reconstruction system according to aspects of the present disclosure.

FIG. 6 is a diagram illustrating an example of a hardware implementation for a depth estimation system 600, according to aspects of the present disclosure. The depth estimation system 600 may be a component of a vehicle, a robotic device, or another device. For example, as shown in FIG. 4, the depth estimation system 600 is a component of a vehicle 628. Aspects of the present disclosure are not limited to the depth estimation system 600 being a component of the vehicle 628, as other types of agents, such as a bus, boat, drone, or robot, are also contemplated for using the depth estimation system 600.

The vehicle 628 may operate in one or more of an autonomous operating mode, a semi-autonomous operating mode, and a manual operating mode. Furthermore, the vehicle 628 may be an electric vehicle, a hybrid vehicle, a fuel vehicle, or another type of vehicle.

The depth estimation system 600 may be implemented with a bus architecture, represented generally by a bus 660. The bus 660 may include any number of interconnecting buses and bridges depending on the specific application of the depth estimation system 600 and the overall design constraints. The bus 660 links together various circuits including one or more processors and/or hardware modules, represented by a processor 620, a communication module 622, a location module 618, a sensor module 602, a locomotion module 626, a navigation module 624, and a computer-readable medium 614. The bus 660 may also link various other circuits such as timing sources, peripherals, voltage regulators, and power management circuits, which are well known in the art, and therefore, will not be described any further.

The depth estimation system 600 includes a transceiver 616 coupled to the processor 620, the sensor module 602, a scene reconstruction module 608, the communication module 622, the location module 618, the locomotion module 626, the navigation module 624, and the computer-readable medium 614. The transceiver 616 is coupled to an antenna 644. The transceiver 616 communicates with various other devices over one or more communication networks, such as an infrastructure network, a V2V network, a V2I network, a V2X network, a V2P network, or another type of network. As an example, the transceiver 616 may transmit a warning to other agents when a scene reconstruction module 608 determines that an occluded area is occluding high risk information.

The depth estimation system 600 includes the processor 620 coupled to the computer-readable medium 614. The processor 620 performs processing, including the execution of software stored on the computer-readable medium 614 providing functionality according to the disclosure. The software, when executed by the processor 620, causes the depth estimation system 600 to perform the various functions described for a particular device, such as the vehicle 628, or any of the modules 602, 608, 614, 616, 618, 620, 622, 624, 626. The computer-readable medium 614 may also be used for storing data that is manipulated by the processor 620 when executing the software.

The sensor module 602 may be used to obtain measurements via different sensors, such as a first sensor 606 and a second sensor 604. The first sensor 606 may be a vision sensor, such as a stereoscopic camera or a red-green-blue (RGB) camera, for capturing 2D images. The second sensor 604 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 604, 606.

The measurements of the first sensor 606 and the second sensor 604 may be processed by one or more of the processor 620, the sensor module 602, the scene reconstruction module 608, the communication module 622, the location module 618, the locomotion module 626, the navigation module 624, in conjunction with the computer-readable medium 614 to implement the functionality described herein. In one configuration, the data captured by the first sensor 606 and the second sensor 604 may be transmitted to an external device via the transceiver 616. The first sensor 606 and the second sensor 604 may be coupled to the vehicle 628 or may be in communication with the vehicle 628.

The location module 618 may be used to determine a location of the vehicle 628. For example, the location module 618 may use a global positioning system (GPS) to determine the location of the vehicle 628. The communication module 622 may be used to facilitate communications via the transceiver 616. For example, the communication module 622 may be configured to provide communication capabilities via different wireless protocols, such as WiFi, long term evolution (LTE), 4G, etc. The communication module 622 may also be used to communicate with other components of the vehicle 628 that are not modules of the depth estimation system 600.

The locomotion module 626 may be used to facilitate locomotion of the vehicle 628. As an example, the locomotion module 626 may control a movement of the wheels. As another example, the locomotion module 626 may be in communication with one or more power sources of the vehicle 628, such as a motor and/or batteries. Of course, aspects of the present disclosure are not limited to providing locomotion via wheels and are contemplated for other types of components for providing locomotion, such as propellers, treads, fins, and/or jet engines.

The depth estimation system 600 also includes the navigation module 624 for planning a route or controlling the locomotion of the vehicle 628, via the locomotion module 626. The navigation module 624 may override user input when the user input is expected (e.g., predicted) to cause a collision. The modules may be software modules running in the processor 620, resident/stored in the computer-readable medium 614, one or more hardware modules coupled to the processor 620, or some combination thereof.

The scene reconstruction module 608 may be in communication and/or work in conjunction with one or more of the sensor module 602, the transceiver 616, the processor 620, the communication module 622, the location module 618, the locomotion module 626, the navigation module 624, the first sensor 606, the second sensor 604 and the computer-readable medium 614. In one configuration, the scene reconstruction module 608 may be configured for generating a depth estimate and a first pose estimate from a current image. The current image may be obtained from one or more of the first sensor 606, the second sensor 604, and the sensor module 602. The scene reconstruction module 608 may implement a depth network, such as the depth network 300 described in reference to FIG. 3, and a pose network, such as the pose network 400 described in reference to FIG. 4.

The scene reconstruction module 608 may also be configured for generating a second pose estimate based on the current image and one or more previous image in a sequence of images. The scene reconstruction module may further be configured for generating a warped image by warping each pixel in the current image based on the depth estimate, the first pose estimate, and the second pose estimate. Additionally, the scene reconstruction module 608 may still further be configured for controlling an action of an agent based on the second warped image.

Figure 7:
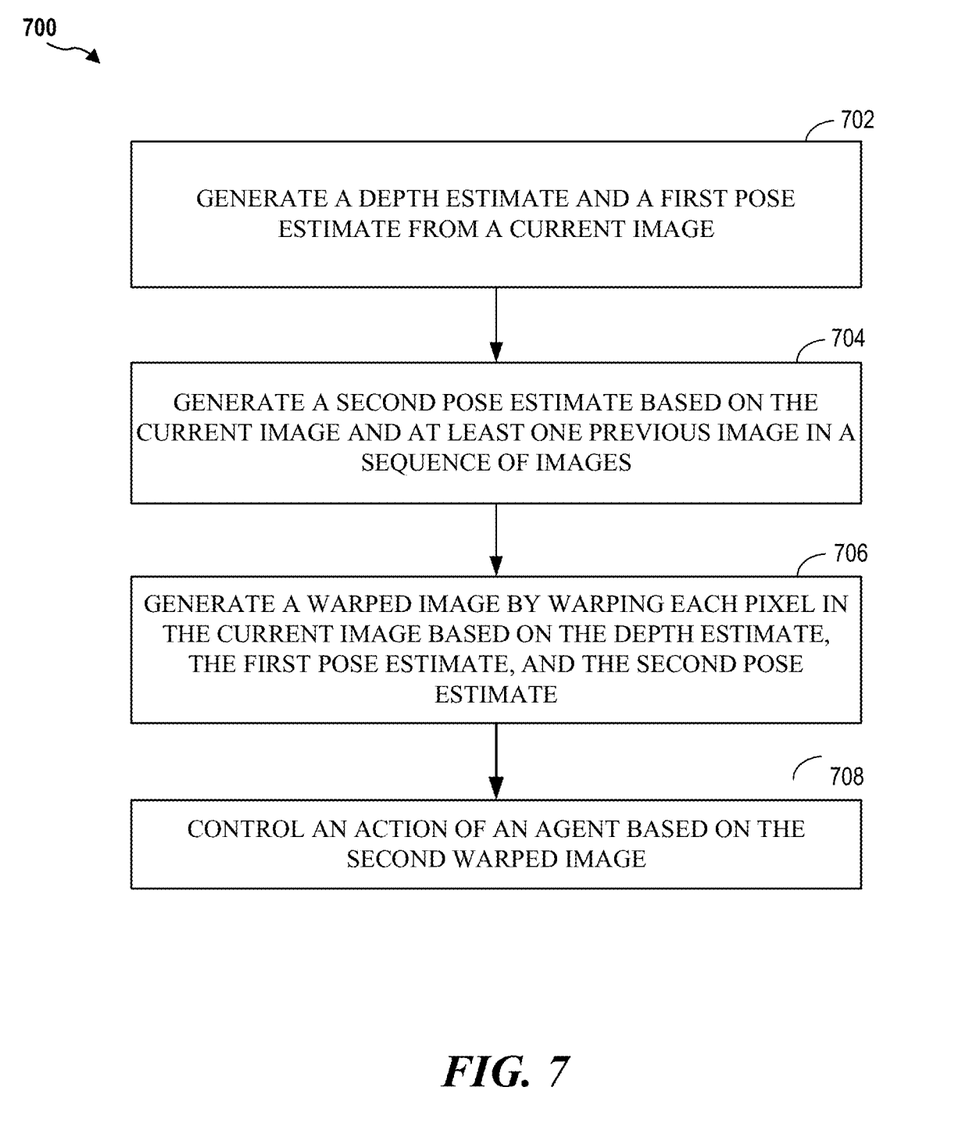
FIG. 7 illustrates a flow diagram for a method according to aspects of the present disclosure.

FIG. 7 is a diagram illustrating an example process 700 performed in accordance with various aspects of the present disclosure. The process 700 may be performed by a vehicle, such as a vehicle 100 as described with reference to FIG. 1, and/or a scene reconstruction module of a vehicle, such as the scene reconstruction module 608 as described with reference to FIG. 6. The vehicle may be referred to as an agent. The example process 700 is an example of pixel-wise residual pose estimation for monocular depth estimation.

As shown in FIG. 7, in some aspects, the process 700 may include generating a depth estimate and a first pose estimate from a current image (block 702). The process 700 may also include generating a second pose estimate based on the current image and at least one previous image in a sequence of images (block 704). Furthermore, the process 700 may include generating a warped image by warping each pixel in the current image based on the depth estimate, the first pose estimate, and the second pose estimate (block 706). Finally, the process 700 may include controlling an action of an agent based on the second warped image (block 708).

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for scene reconstruction, comprising:
generating, at a depth estimation model, both a depth estimate and a first pose estimate from a current image;
generating, at a pose estimation model, a second pose estimate based on the current image and at least one previous image in a sequence of images;
generating a warped image by warping each pixel in the current image based on the depth estimate, the first pose estimate, and the second pose estimate; and
controlling an action of an agent based on the generated warped image.

2. The method of claim 1, further comprising:
generating a transformation matrix based on the first pose estimate and the second pose estimate; and
generating the warped image by warping each pixel in the current image based on the depth estimate and the transformation matrix.

3. The method of claim 1, in which the first pose estimate and the second pose estimate comprise both an x, y, z, translation and a roll, pitch, and yaw translation.

4. The method of claim 1, further comprising obtaining the current image from a monocular camera, in which the current image is a two-dimensional image.

5. The method of claim 1, in which the warped image is a three-dimensional image.

6. The method of claim 1, further comprising determining a local transformation and a global transformation for each pixel.

7. An apparatus for scene reconstruction, comprising:
a processor;
a memory coupled with the processor; and
instructions stored in the memory and operable, when executed by the processor, to cause the apparatus:
to generate, at a depth estimation model, both a depth estimate and a first pose estimate from a current image;
to generate, at a pose estimation model, a second pose estimate based on the current image and at least one previous image in a sequence of images;
to generate a warped image by warping each pixel in the current image based on the depth estimate, the first pose estimate, and the second pose estimate; and
to control an action of an agent based on the generated warped image.

8. The apparatus of claim 7, in which execution of the instructions further cause the apparatus:
to generate a transformation matrix based on the first pose estimate and the second pose estimate; and
to generate the warped image by warping each pixel in the current image based on the depth estimate and the transformation matrix.

9. The apparatus of claim 7, in which the first pose estimate and the second pose estimate comprise both an x, y, z, translation and a roll, pitch, and yaw translation.

10. The apparatus of claim 7, in which:
execution of the instructions further cause the apparatus to obtain the current image from a monocular camera; and
the current image is a two-dimensional image.

11. The apparatus of claim 7, in which the warped image is a three-dimensional image.

12. The apparatus of claim 7, in which execution of the instructions further cause the apparatus determine a local transformation and a global transformation for each pixel.

13. A non-transitory computer-readable medium having program code recorded thereon for scene reconstruction, the program code executed by a processor and comprising:
program code to generate, at a depth estimation model, both a depth estimate and a first pose estimate from a current image;
program code to generate, at a pose estimation model, a second pose estimate based on the current image and at least one previous image in a sequence of images;
program code to generate a warped image by warping each pixel in the current image based on the depth estimate, the first pose estimate, and the second pose estimate; and
program code to control an action of an agent based on the generated warped image.

14. The non-transitory computer-readable medium of claim 13, in which the program code further comprises:
program code to generate a transformation matrix based on the first pose estimate and the second pose estimate; and program code to generate the warped image by warping each pixel in the current image based on the depth estimate and the transformation matrix.

15. The non-transitory computer-readable medium of claim 13, in which the first pose estimate and the second pose estimate comprise both an x, y, z, translation and a roll, pitch, and yaw translation.

16. The non-transitory computer-readable medium of claim 13, in which:
the program code further comprises program code to obtain the current image from a monocular camera; and
the current image is a two-dimensional image.

17. The non-transitory computer-readable medium of claim 13, in which the warped image is a three-dimensional image.

18. The non-transitory computer-readable medium of claim 13, in which the program code further comprises program code to determine a local transformation and a global transformation for each pixel.

* * * * *